United States Patent [19]
Liang et al.

[11] Patent Number: 5,793,167
[45] Date of Patent: Aug. 11, 1998

[54] OPERATION OF A MOTOR VEHICLE ALTERNATOR

[75] Inventors: Feng Liang, Canton; Garold Paul Myers, Northville; Paul Theodore Momcilovich, Carleton; Shahram Zarei, Farmington Hills, all of Mich.

[73] Assignee: Ford Global Technologies, Inc., Dearborn, Mich.

[21] Appl. No.: 801,274

[22] Filed: Feb. 18, 1997

Related U.S. Application Data

[63] Continuation-in-part of Ser. No. 523,761, Sep. 5, 1995, Pat. No. 5,648,705.

[51] Int. Cl.[6] .................................................. H02P 9/00
[52] U.S. Cl. ........................ 318/141; 322/17; 322/37
[58] Field of Search ............................ 318/140, 141; 322/17, 37; 290/4 B, 5

[56] References Cited

U.S. PATENT DOCUMENTS

| | | | |
|---|---|---|---|
| 4,479,082 | 10/1984 | Schauder et al. | 318/799 |
| 4,496,897 | 1/1985 | Unnewehr et al. | |
| 4,767,976 | 8/1988 | Mutoh et al. | 318/308 |
| 4,771,224 | 9/1988 | Elms | 318/809 |
| 4,788,485 | 11/1988 | Kawagishi et al. | 318/811 |
| 4,912,378 | 3/1990 | Vukosavic | 318/254 |
| 5,038,092 | 8/1991 | Ansono et al. | 318/811 |
| 5,250,890 | 10/1993 | Tanamachi | 318/811 |
| 5,255,175 | 10/1993 | Uchino | 363/81 |
| 5,266,836 | 11/1993 | Sousa | 290/31 |
| 5,285,144 | 2/1994 | Hsu et al. | 318/807 |
| 5,325,042 | 6/1994 | Murugan | 322/10 |
| 5,408,067 | 4/1995 | Crouse | 219/137 |

*Primary Examiner*—Bentsu Ro
*Attorney, Agent, or Firm*—Roger L. May; Mark S. Sparschu

[57] ABSTRACT

A conventional full wave diode bridge of an alternator is replaced with a full wave controlled rectifier bridge having controlled switches in place of diodes and the rectifier bridge is controlled in response to a third harmonic of the voltage generated by the alternator to synchronize the rectifier bridge with the alternator and to increase output power from the alternator. The alternator includes a rotor having a field winding receiving a field current which is controlled up to a maximum field current for partial control of the output power produced by the alternator. Power produced by the alternator is also controlled by introducing a phase angle between the phase voltages at the three output connections of the stator winding and the third harmonic up to a maximum or optimum phase angle. To increase power output from the alternator, preferably the field current is increased up to a maximum before any phase angle is introduced between the phase voltages and the third harmonic. Similarly, the phase angle is reduced to zero before the field current is reduced if power generated by the alternator is to be decreased.

18 Claims, 8 Drawing Sheets

FIG-7

| MODE | TIME INTERVAL | CONNECTION | TERMINAL VOLTAGE | |
|---|---|---|---|---|
| 1<br>A+<br>B-<br>C+<br>ON | $0 < \omega_e t < \frac{\pi}{3}$ | | $V_{ab} = V_{dc}$<br>$V_{bc} = -V_{dc}$<br>$V_{ca} = 0$ | $V_{an} = \frac{V_{dc}}{3}$<br>$V_{bn} = -\frac{2V_{dc}}{3}$<br>$V_{cn} = \frac{V_{dc}}{3}$ |
| 2<br>A+<br>B-<br>C-<br>ON | $\frac{\pi}{3} < \omega_e t < \frac{2\pi}{3}$ | | $V_{ab} = V_{dc}$<br>$V_{bc} = 0$<br>$V_{ca} = -V_{dc}$ | $V_{an} = \frac{2V_{dc}}{3}$<br>$V_{bn} = -\frac{V_{dc}}{3}$<br>$V_{cn} = -\frac{V_{dc}}{3}$ |
| 3<br>A+<br>B+<br>C-<br>ON | $\frac{2\pi}{3} < \omega_e t < \pi$ | | $V_{ab} = 0$<br>$V_{bc} = V_{dc}$<br>$V_{ca} = -V_{dc}$ | $V_{an} = \frac{V_{dc}}{3}$<br>$V_{bn} = \frac{V_{dc}}{3}$<br>$V_{cn} = -\frac{2V_{dc}}{3}$ |
| 4<br>A-<br>B+<br>C-<br>ON | $\pi < \omega_e t < \frac{4\pi}{3}$ | | $V_{ab} = -V_{dc}$<br>$V_{bc} = V_{dc}$<br>$V_{ca} = 0$ | $V_{an} = -\frac{V_{dc}}{3}$<br>$V_{bn} = \frac{2V_{ac}}{3}$<br>$V_{cn} = -\frac{V_{dc}}{3}$ |
| 5<br>A-<br>B+<br>C+<br>ON | $\frac{4\pi}{3} < \omega_e t < \frac{5\pi}{3}$ | | $V_{ab} = -V_{dc}$<br>$V_{bc} = 0$<br>$V_{ca} = V_{dc}$ | $V_{an} = -\frac{2V_{dc}}{3}$<br>$V_{bn} = \frac{V_{dc}}{3}$<br>$V_{cn} = \frac{V_{dc}}{3}$ |
| 6<br>A-<br>B-<br>C+<br>ON | $\frac{5\pi}{3} < \omega_e t < 2\pi$ | | $V_{ab} = 0$<br>$V_{bc} = -V_{dc}$<br>$V_{ca} = V_{dc}$ | $V_{an} = -\frac{V_{dc}}{3}$<br>$V_{bn} = -\frac{V_{dc}}{3}$<br>$V_{cn} = \frac{2V_{dc}}{3}$ |

OPERATION OF A MOTOR VEHICLE ALTERNATOR

CROSS-REFERENCE TO RELATED APPLICATIONS

This application is a continuation-in-part of U.S. patent application Ser. No. 08/523,761 filed Sep. 5, 1995, now U.S. Pat. No. 5,648,705, and entitled MOTOR VEHICLE ALTERNATOR AND METHODS OF OPERATION, the disclosure of which is hereby incorporated by reference.

BACKGROUND OF THE INVENTION

The present invention relates generally to alternators and, more particularly, to improved methods for operating alternators to improve alternator output current, particularly at lower speeds. While the present invention is generally applicable, it will be described herein with reference to use in motor vehicles.

A conventional motor vehicle alternator includes a three phase stator winding with a rotor magnetically coupled to the stator and driven by the vehicle's internal combustion engine. As the rotor is driven, three phase alternating current (ac) voltage, generated at output connections of the stator winding, is rectified by a three phase diode rectifier bridge. Unfortunately, the output current and efficiency, both mechanical and electrical, of the alternator vary with the speed of the engine which is controlled for the mechanical requirements of the vehicle. At low speeds, the alternator output may be insufficient to provide the power needed to operate all electrical equipment of the vehicle while at high speeds, power generation is sufficient to exceed these requirements.

The operating speed of an alternator used in the electrical system of a motor vehicle may be varied to overcome the noted inconsistencies between power generation and power requirements and to advantageously generate sufficient power for the motor vehicle when the engine is operating at a low speed. For example, a variety of two speed alternators operable at a higher speed for low speed operation of the corresponding motor vehicle engine are known.

While such alternator control arrangements are useful in providing adequate power at low engine speeds or for protecting alternators at high engine speeds, they rely on mechanical speed change devices which can be complex and not highly reliable.

Accordingly, there is a need for an improved alternator which is reliable and does not rely on mechanical speed changing devices to improve alternator operation and arrangements for controlling operation of such an alternator for example in a motor vehicle.

BRIEF SUMMARY OF THE INVENTION

This need is met by the invention of the present application wherein a conventional full wave diode bridge of an alternator is replaced with a full wave controlled rectifier bridge having controlled switches in place of diodes and the rectifier bridge is controlled in response to a third harmonic of the voltage generated by the alternator to synchronize the rectifier bridge with the alternator and to increase output power from the alternator. The alternator includes a rotor having a field winding receiving a field current which is controlled up to a maximum field current for partial control of the output power produced by the alternator. Power produced by the alternator is also controlled by introducing a phase angle between the phase voltages at the three output connections of the stator winding and the third harmonic up to a maximum or optimum phase angle. To increase power output from the alternator, preferably the field current is increased up to a maximum before any phase angle is introduced between the phase voltages and the third harmonic. Similarly, the phase angle is reduced to zero before the field current is reduced if power generated by the alternator is to be decreased.

In accordance with one aspect of the present invention, a method is provided for operating an alternator to generate ac power which is rectified to produce direct current (dc) power at a dc output wherein the alternator includes a three phase stator winding having three output connections and a rotor having a field winding receiving a field current. The rotor is magnetically coupled to the stator winding and mechanically driven to generate three phase power at the three output connections of the stator winding. A full wave controlled rectifier bridge is connected between the three output connections of the stator winding and the dc output. A third harmonic of voltage generated by the alternator is determined, and the rectifier bridge is controlled in response to the third harmonic to synchronize the rectifier bridge with the alternator. The field current and a phase angle between phase voltages at the three output connections of the stator winding and the third harmonic are controlled to improve operation of the alternator and, in particular, to control and increase output power generated by the alternator.

In accordance with another aspect of the present invention, a method is provided for operating an alternator to generate ac power which is rectified to produce dc power at a dc output wherein the alternator includes a three phase stator winding having three output connections and a rotor having a field winding receiving a field current. The rotor is magnetically coupled to the stator winding and mechanically driven to generate three phase power at the three output connections of the stator winding. A full wave controlled rectifier bridge is connected between the three output connections of the stator winding and the dc output, and a third harmonic of voltage generated by the alternator is determined. The rectifier bridge is controlled in response to the third harmonic to synchronize the rectifier bridge with the alternator, and further the rectifier bridge is further controlled to define a phase angle between phase voltages at the three output connections of the stator winding and the third harmonic. The phase angle control together with field current control are utilized to control the output power of the alternator.

In accordance with yet another aspect of the present invention, a method is provided for operating an alternator to generate ac power which is rectified to produce dc power at a do output wherein the alternator includes a three phase stator winding having three output connections and a rotor having a field winding receiving a field current. The rotor is magnetically coupled to the stator winding and mechanically driven to generate three phase power at the three output connections of the stator winding. A full wave controlled rectifier bridge is connected between the three output connections of the stator winding and the dc output. A third harmonic of voltage generated by the alternator is determined. The rectifier bridge is controlled in response to the third harmonic to synchronize the rectifier bridge with the alternator. The field current is controlled in response to output power required from the alternator up to a maximum field current and, upon reaching the maximum field current, the rectifier bridge is further controlled to introduce a phase angle between phase voltages at the three output connections of the stator winding and the third harmonic in response to output power required from the alternator.

It is, thus, a feature of the present invention to provide an improved method of operating an alternator for generating ac power which is rectified to produce a dc output which provides improved alternator output current, particularly at lower speeds; to provide an improved method of operating an alternator for a motor vehicle in response to the third harmonic of the voltage generated by the alternator for improving alternator output current, particularly at lower engine speeds; and, to provide an improved method of operating an alternator for a motor vehicle which provides improved alternator output current, particularly at lower engine speeds by controlling a full wave controlled rectifier bridge to control field current and the phase shift between a third harmonic of the voltage generated by the alternator and phase voltages of the alternator to control and increase output current from the alternator, particularly at lower engine speeds.

Other features and advantages of the invention will be apparent from the following description, the accompanying drawings and the appended claims.

BRIEF DESCRIPTION OF THE DRAWING

FIG. 7 is a table illustrating six switching modes used for six-step control of corresponding connections of a full wave controlled rectifier bridge, and the line-to-line and line-to-neutral voltages of each mode;

DETAILED DESCRIPTION OF THE INVENTION

Figure 1:
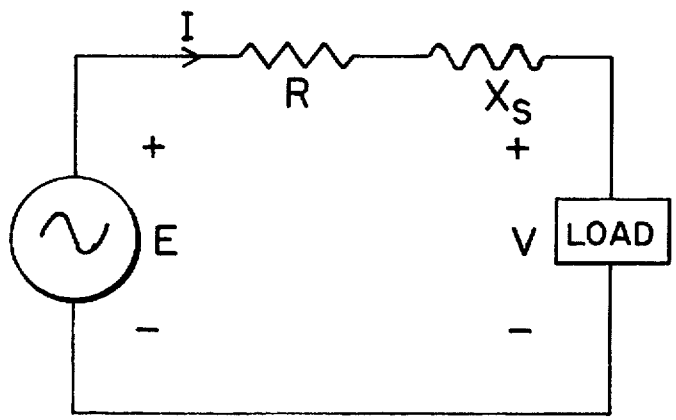
FIG. 1 is a schematic diagram of an equivalent circuit of a synchronous machine with uniform air gap.

Prior to description of the present invention, a brief analysis of synchronous machines will be made to provide technical background for the description of the alternator control method and apparatus of the present invention. FIG. 1 is a schematic diagram of an equivalent circuit of a synchronous machine with uniform air gap wherein: E is a phasor representing the voltage or back electromagnetic force (EMF) generated in the phases of the stator winding by a rotating flux wave produced by a driven rotor which is magnetically coupled to the stator winding; I is a phasor representing the phase current; R is the resistance of the stator winding; Xs is the synchronous reactance of the stator winding; and, V is a phasor representing the phase voltage. For a motor vehicle, the alternator load comprises a rectifier, a battery and selectively activated electrically operated devices of the motor vehicle.

Figure 2:
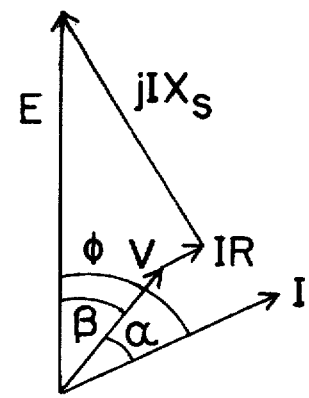
FIGS. 2–5 are phasor diagrams illustrating various operating conditions of the synchronous machine of FIG. 1.

FIG. 2 is a phasor diagram for the synchronous machine model of FIG. 1 wherein $\phi$ is the angle between the back EMF E and the current I, $\beta$ is the angle between the back EMF E and the phase voltage V, and $\alpha$ is the angle between the phase voltage V and the phase current I. The power transferred from the rotor to the stator, air gap power, is given by the equation:

$$P = EI \cos(\phi)$$

Figure 3:
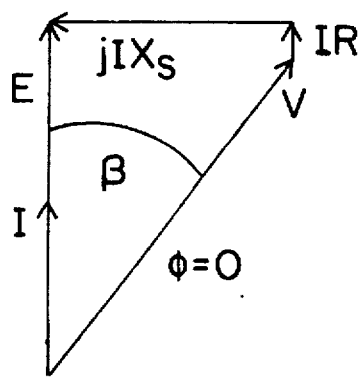

Given the back EMF E, limited by the speed and flux, and phase current I, limited by the cooling conditions of the machine, maximum air gap power is obtained if the phase current I: is in phase with the back EMF E, commonly referred to as field oriented, and accordingly, the machine operates at maximum power. In this operating mode, the machine has highest power density. Unfortunately, such operating mode cannot be achieved in a conventional motor vehicle charging system because in this operating mode the terminal voltage is usually higher than the back EMF E, as shown in FIG. 3, while the terminal voltage is smaller than the back EMF E in a conventional motor vehicle charging system.

Figure 4:
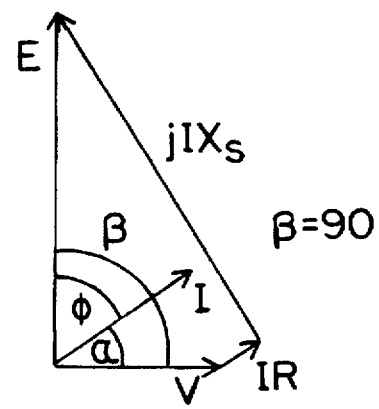
Figure 5:
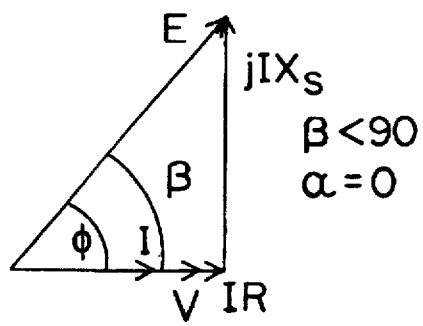

In a motor vehicle charging system, the constraints are the terminal voltage, determined by the battery voltage, and the back EMF. According to synchronous machine theory, under such constraints the power will be maximum if the phase shift between the back EMF and the terminal voltage is 90 electrical degrees for uniform air-gap machines, as shown in FIG. 4. Unfortunately, a synchronous machine connected to a diode rectifier can not produce maximum output power because the angle $\beta$ is less than 90° due to the fact that the diodes force the phase current to be in phase with phase voltage, as shown in FIG. 5.

It can be seen that by increasing the angle between the back EMF and the terminal voltage, the output of a synchronous machine can be increased. However, the increase in the output dc current is smaller than the increase in the phase current because the machine has lower power factor when the current is not in phase with the phase voltage. In the invention of the present application, a full wave controlled rectifier bridge is used to control the angle $\beta$ between the EMF and the phase voltage by manipulating the connections of the terminal voltage of the synchronous machine or alternator. This control increases the output of the alternator, particularly at low speeds, see FIG. 9, and can also be used to control overvoltage, i.e., load dump transient voltage, and voltage regulation within the charging system of a motor vehicle. The control of overvoltage is performed using the controlled rectifier bridge by turning on all the upper switches of the bridge or all the lower switches of the bridge at the same time, see FIG. 6.

Since the battery is a voltage source, the voltages applied to the output connections of the stator winding of the alternator are directly controlled by the full wave controlled rectifier bridge rather than the phase currents of the machine. Accordingly, the control for the controlled rectifier bridge is to synthesize ac terminal voltages such that the synthesized terminal voltages interact with the back EMF to produce required current flow. The requirements for the synthesized terminal voltages are as follows: the frequency of the synthesized terminal voltages must be the same as that of the back EMF, otherwise the machine will not have any average output power; the magnitude of the terminal voltage should be the maximum possible, which is limited by the battery voltage, for the machine to have highest possible output power with a given field current; and the angle between the phase voltage and the corresponding back EMF should be such that the machine will provide the current demanded, not necessarily the maximum all the time.

There are several known methods to synthesize the terminal voltages such as sine-triangle PWM, voltage space vector PWM and six-step control. Six-step control produces the highest fundamental component voltage and it is also simple to implement. However, it has larger low-order harmonic components compared with the other control methods. Because the base frequency of an alternator of a motor vehicle charging system is quite high, greater than 150 Hz, the harmonic voltage components do not generate sufficiently large harmonic currents to be a problem if six-step control is used. Accordingly, due to its simplicity and higher fundamental voltage, six-step control is preferred for the alternator control system of the present application.

Figure 6:
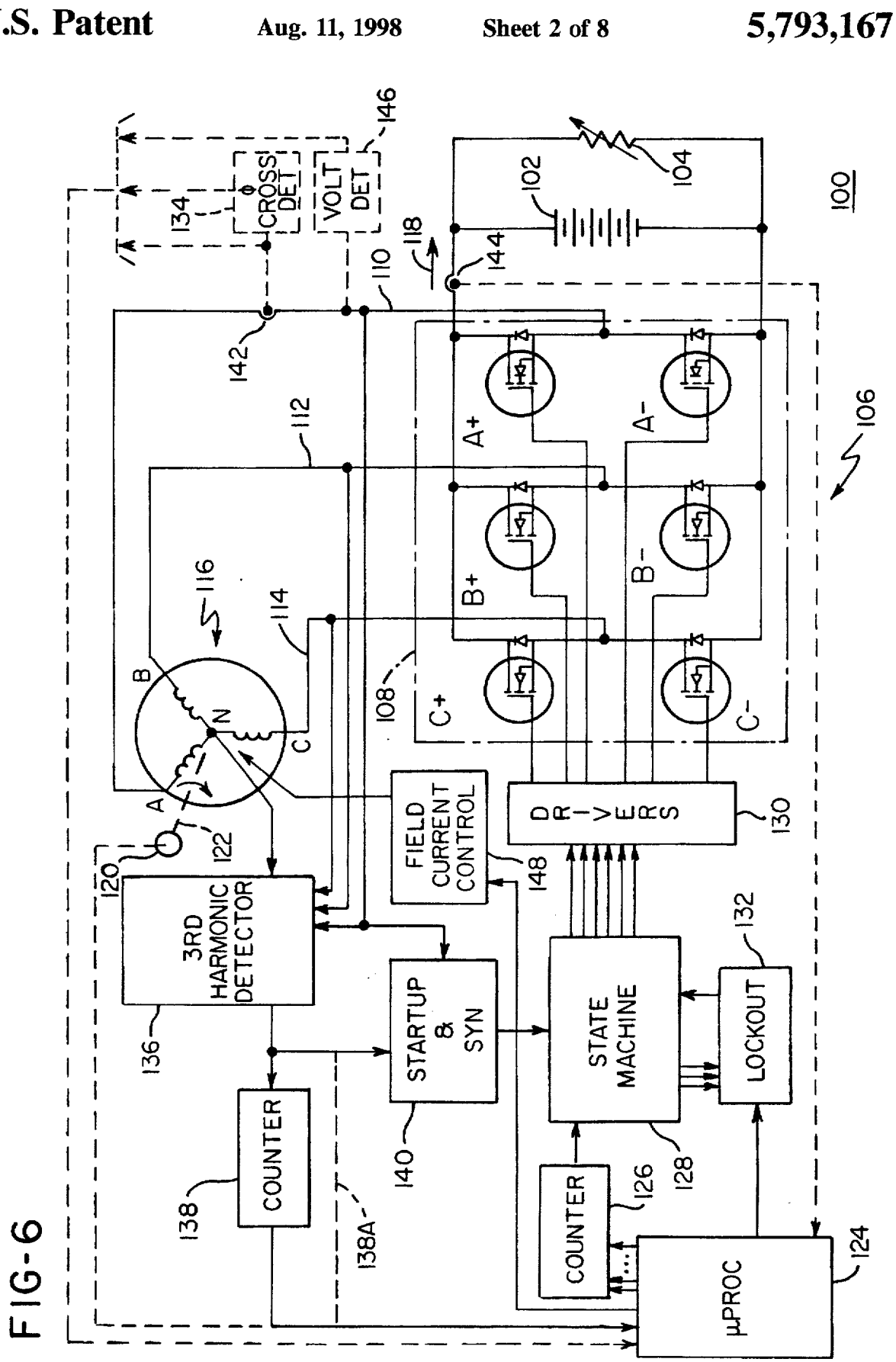
FIG. 6 is a schematic block diagram of a motor vehicle electrical system including an alternator operable in accordance with the present invention.
Figure 8:
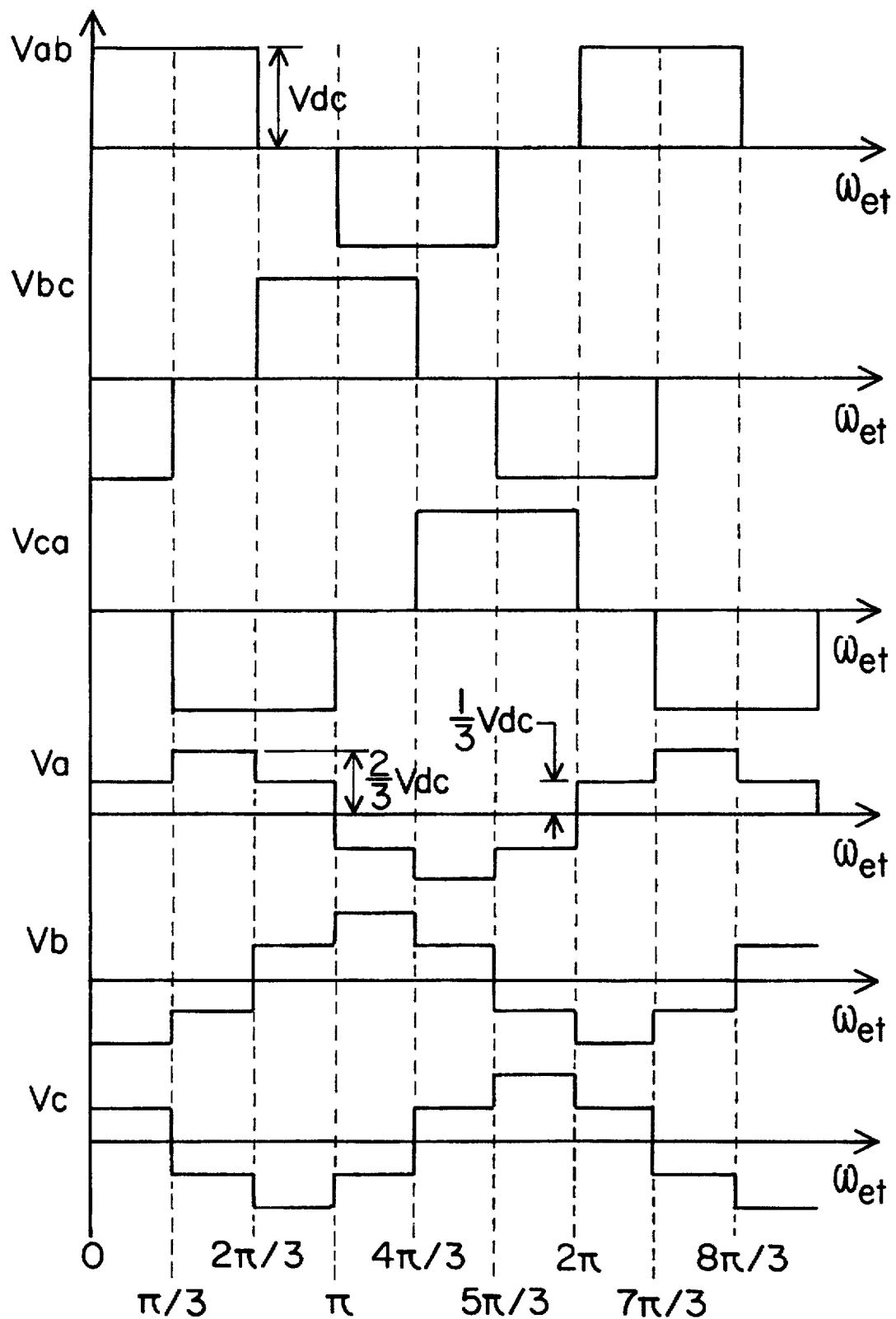
FIG. 8 is a series of graphs illustrating six-step control of a full wave controlled rectifier bridge.

FIG. 6 is a schematic block diagram of a motor vehicle electrical system 100 including a battery 102, a load 104 made up of selectively activated electrically operated devices of the motor vehicle and an alternator 106 operable in accordance with the present invention. A full wave controlled rectifier bridge 108 is constructed using six switches which are illustrated as six MOSFETs $A^+$, $A^-$, $B^+$, $B^-$, $C^+$, $C^-$, of course a variety of controlled switch devices can be used in the present invention as will be apparent to those skilled in the art. The six switching modes used for six-step control of the corresponding connections and the line-to-line and line-to-neutral voltages of each mode are given in FIG. 7. If the six switches are turned on and off in these six modes sequentially and each mode is maintained for one sixth of the fundamental cycle of the alternator 106, the voltages at the output connections 110, 112, 114 of the three phase stator winding 116 of the alternator 106 will have the waveforms shown in FIG. 8.

It is known that three phase ac voltages can be synthesized from a dc voltage as long as the switching modes 1–6 shown in FIG. 7 are changed sequentially among the six switching modes. In like manner, the battery 102 and load 104 can be connected to the three phase ac voltages generated at the output connections 110, 112, 114 of the three phase stator winding 116 of the alternator 106 by the six switches of the rectifier bridge 108 such that a dc current 118 flows from the rectifier bridge 108 to the battery 102 and load 104, again provided that the switching modes 1–6 shown in FIG. 7 are changed sequentially among the six switching modes.

The timing for the change of switching modes or states is chosen such that the rectifier bridge 108 is synchronous with the alternator 106 so that the frequency of the three phase ac voltages generated at the output connections 110, 112, 114 of the stator winding 116 is the same as the frequency of the back EMF E. Synchronization of the rectifier bridge 108 with the alternator 106 as used herein means the rectifier bridge 108 is synchronized with the three phase ac voltages generated at the output connections 110, 112, 114 of the three phase stator winding 116 of the alternator 106. The synchronization of the rectifier bridge 108 with the alternator 106 can be performed with a minimum amount of information regarding the back EMF, i.e., the synchronous frequency of the alternator 106, as will be described with respect to a variety of control strategies for switching the states of the connections through the bridge 108.

The objective of all of these control strategies is to control the power angle, i.e. the angle between the ac terminal voltage at the output of the connections 110, 112, 114 of the alternator 106 and the back EMF, either directly or, preferably, indirectly by controlling another angle. For example, the output power can be controlled by controlling the power factor angle, i.e. the angle between the phase current and phase voltage. Such control dramatically increases output performance of the alternator 106, particularly at low speeds, without increasing the volume or weight of the alternator 106. In addition, by using the full wave controlled rectifier bridge 108, overvoltage, for example due to load dump, can be controlled and the conventional voltage regulation function can be performed by proper control of the bridge 108.

A first strategy utilizes an angular position encoder 120 connected to a rotor shaft 122 to determine the position of the rotor shaft 122 and thereby the back EMF in the three phase stator winding 116. The resulting information is used by a microprocessor 124 to determine and set a switch state timer in the microprocessor 124 which is to be one sixth of an electrical cycle, and a delay time which is a function of desired delay angle and electrical speed. This results in the switch times for the switches of the bridge 108. Unfortunately, packaging, cost and reliability issues associated with the angular position encoder 120 make this strategy undesirable for automotive alternator control where packaging of the alternator has already become an issue, and low cost and high reliability have always been requirements.

In the alternator 106 of FIG. 6, the switch times are passed to a counter 126 which is down-counted to generate clock pulses for a state machine 128 which in response activates driver circuits 130 for controlling the conduction states of the switches of the bridge 108. A lockout circuit 132, illustrated as a lockout counter coupled to the state machine 128, ensures that two switches in the same leg of the bridge 108, e.g. $A^+$, $A^-$, are never turned on at the same time. In a working embodiment of the alternator 106, an 80C196 microprocessor was used as the microprocessor 124 and an Altera EPLD was used as the state machine 128; however, a large variety of microprocessors and state machines can be utilized.

A second strategy utilizes a zero-crossing detector 134 for a phase current. The resulting position detection is utilized by the microprocessor 124 to introduce a desired delay angle between the detection of the zero-crossing of the phase current and the application of the terminal voltage, i.e. the timing of the state transitions of the switches in the bridge 108. As previously noted, control of this angle is analogous to control of the angle between the back EMF and the terminal voltages.

A third strategy, which is currently preferred, uses the third harmonic voltage of the alternator 106. In FIG. 6, the third harmonic within the voltage generated by the alternator 106 is generated by combining the three phase voltages and the neutral N from the stator winding 116 within a third harmonic detector circuit 136 in a well known manner. The resulting third harmonic voltage signal is converted to a square wave and passed to a counter circuit 138 which generates a fundamental frequency output pulse for each six pulses of the third harmonic voltage signal which replaces the output signal from the angular position encoder 120 to define the speed of the alternator 106. Improved precision can be obtained, if desired, by having the microprocessor 124 use the third harmonic voltage signal directly as indicated by the dotted line 138A.

Figure 10:
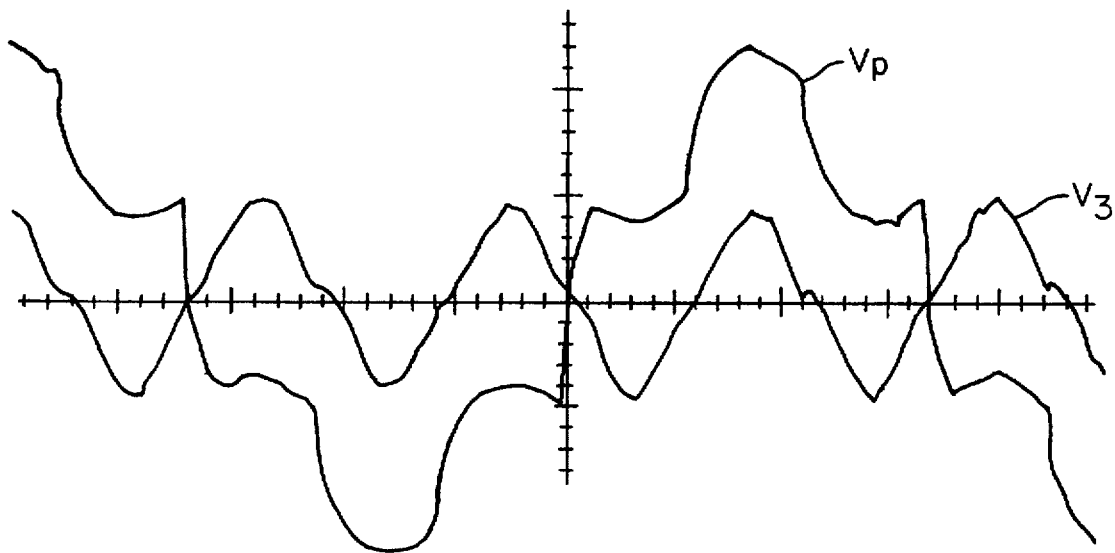
FIG. 10 illustrates waveforms of a third harmonic voltage $V_3$ and a phase voltage $V_p$ of an alternator connected to a diode rectifier bridge.
Figure 11:
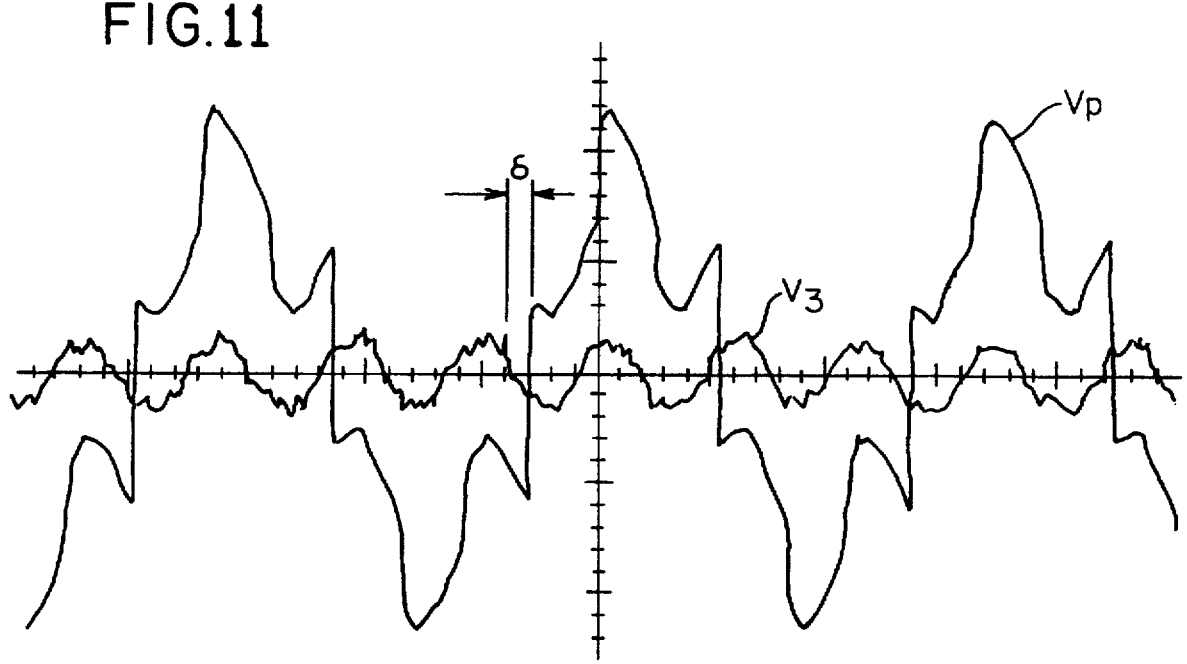
FIG. 11 illustrates a phase angle $\delta$ introduced between $V_p$ and $V_3$ in an alternator control strategy utilizing the third harmonic voltage of the alternator.

For the third harmonic control strategy, a startup and synchronization circuit 140 receives one phase voltage arbitrarily designated as phase A and the third harmonic voltage signal from the third harmonic detector circuit 136 to generate a startup and synchronization signal corresponding to and identifying the negative to positive voltage zero-crossings of phase A which signal is passed to the state machine 132. FIG. 10 shows measured third harmonic and phase voltage waveforms of an unloaded alternator connected to a diode rectifier bridge. It can be seen that when the phase voltage $V_p$ is zero, the third harmonic voltage $V_3$ is also zero. However, with the full wave controlled rectifier bridge 108, it is possible to delay or advance $V_p$ with respect to $V_3$. As a result, a phase shift angle or phase angle $\delta$ can be introduced between $V_p$ and $V_3$ as shown in FIG. 11. By mapping the output power onto the phase angle $\delta$, the output power can be maximized by controlling the phase angle $\delta$ to be at a value which is optimum to maximize or provide the desired amount of power. Thus, for the third harmonic control strategy, the output power can be maximized or optimized simply and at low cost if the angle $\delta$ is chosen as the control angle.

Figure 12:
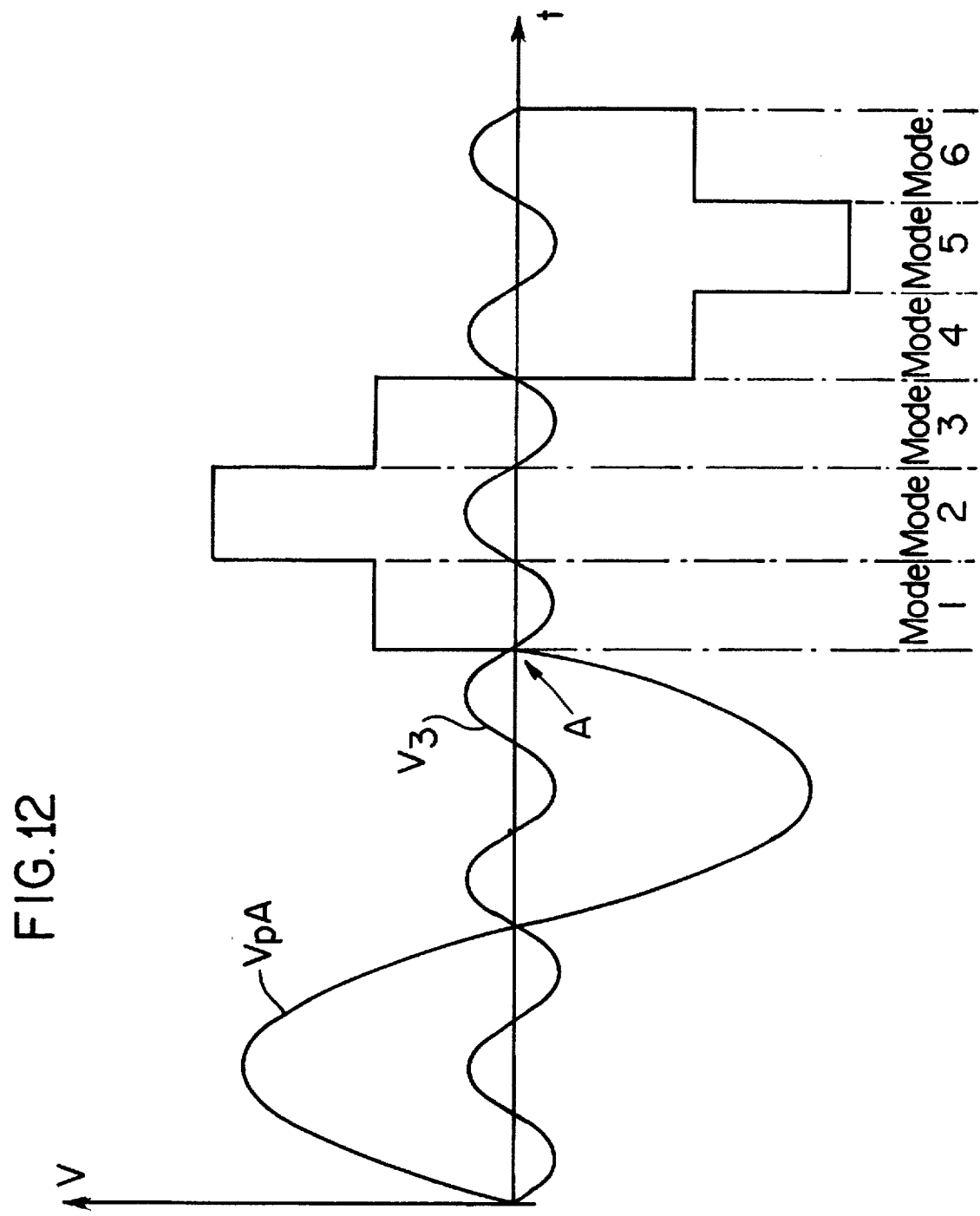
FIG. 12 illustrates synchronization of the rectifier ridge with the alternator in the alternator control strategy utilizing the third harmonic voltage of the alternator.

It can be seen from FIG. 10 that to synchronize the full wave controlled rectifier bridge 108 with the alternator 106, the duration of each switching mode shown in FIG. 7 should be one sixth of the back EMF cycle, which is substantially the same as and estimated by a half cycle of the third harmonic voltage $V_3$. Accordingly, the zero crossings of the third harmonic voltage $V_3$ provide perfect signals for switching mode changes. FIG. 12 illustrates synchronization of the rectifier bridge 108 with the alternator 106. Initially all the switches of the rectifier bridge 108 are turned off. At the moment when phase A voltage $V_{pA}$ crosses zero, as shown by point A in FIG. 12, switches $A^+$, $B^-$, and $C^+$ are turned on and the rectifier bridge 108 is in switching mode 1. Then, the switching mode is changed sequentially, as shown in FIG. 7, with the duration of each mode being one sixth of the back EMF cycle, which is estimated from the third harmonic voltage $V_3$, i.e. the switching mode is changed at the zero crossings of the third harmonic voltage $V_3$.

Figure 13:
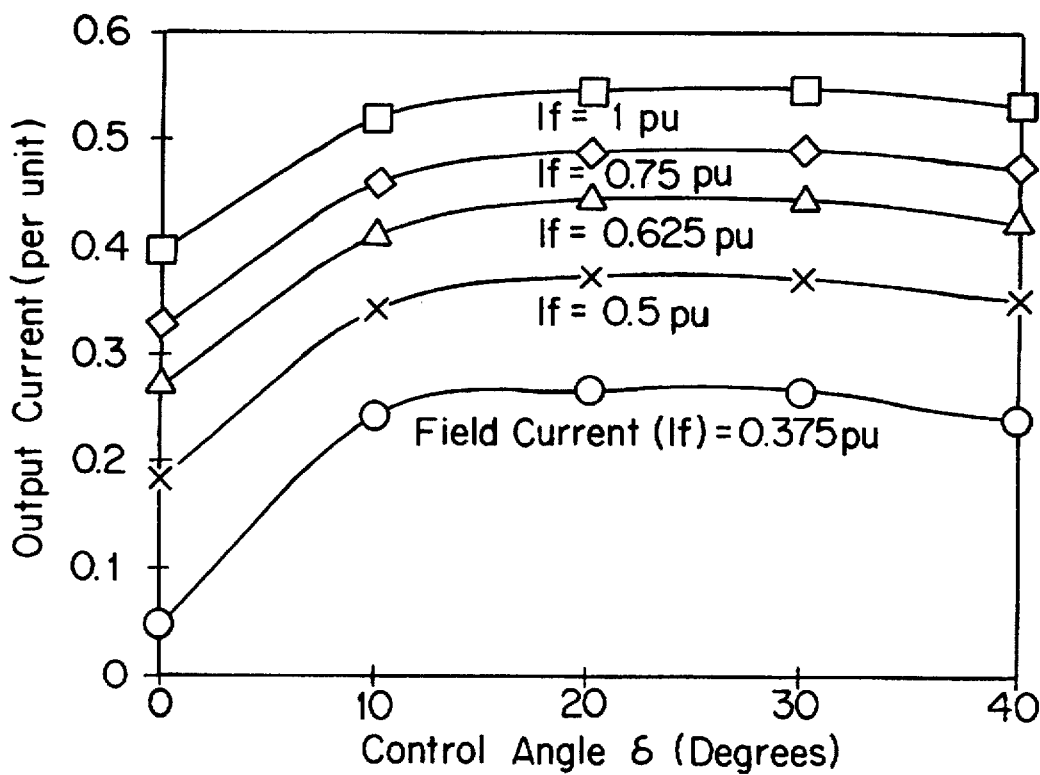
FIGS. 13 and 14 show measured alternator output current as a function of the field current and the phase angle $\delta$ with alternator speeds of 1500 rpm and 3000 rpm, respectively.

If the requirement for the alternator 106 is to maximize its output power, for given operating conditions, such as speed, field current, and temperature, there is an optimum phase angle $\delta$ for each alternator which yields maximum output power. By mapping the output power of an alternator onto the phase angle $\delta$, the optimum phase angle $\delta$ corresponding to different operating conditions can be found empirically. Fortunately, it has been determined that the optimum phase angle $\delta$ does not vary significantly with different operating conditions. FIG. 13 shows the measured output current of an alternator as a function of the field current and the phase angle $\delta$ with alternator speed being 1500 rpm. It can be seen that for the alternator which was measured that the optimum phase angle $\delta$ is in the neighborhood of 300 and it varies very little as the field current changes.

Figure 14:
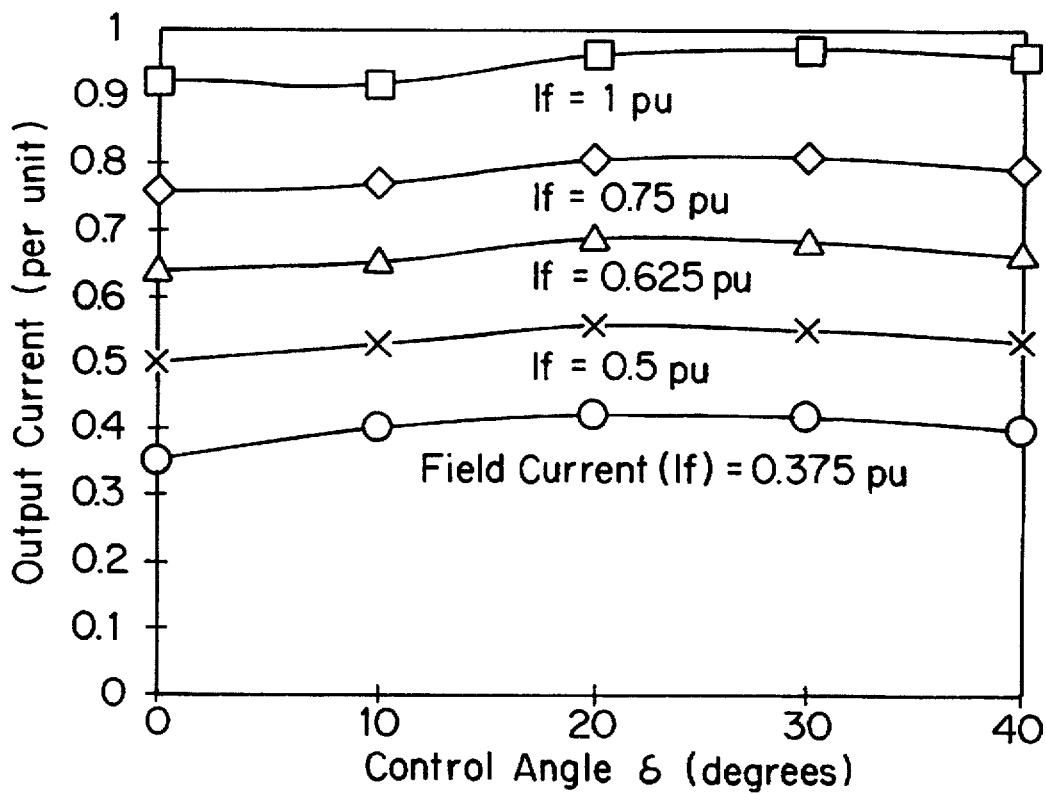

FIG. 14 shows the output current for the alternator which was measured operating at a speed of 3000 rpm. By comparing FIG. 13 and FIG. 14 it can be seen that the optimum phase angle $\delta$ virtually does not change as the speed changes. It also has been determined that the field current and operation temperature has little impact on the optimum phase angle $\delta$. Therefore, it is possible to select one value as the optimum phase angle $\delta$ for all operating conditions for a given alternator or series of similar alternators without sacrificing significant output improvement. It is noted that the optimum phase angle $\delta$ should be determined for each series of alternators since the optimum phase angle $\delta$ varies dependent upon alternator size and parameter variations.

Because the optimum phase angle $\delta$ is determined empirically, the impacts of the rotor saliency, winding resistance, and parameter variations are automatically taken into account. To increase the output power of the alternator 106, the field current is increased first while the phase angle $\delta$ is kept at a constant value which holds the phase current and voltage in phase for higher efficiency. The field current is controlled by the microprocessor 124 via a field current control circuit 148 schematically illustrated in FIG. 6. To further increase the output power after the field current reaches its maximum value, the phase angle $\delta$ is increased by increasing the delay of the switching mode change with respect to the zero crossing of the third harmonic voltage $V_3$ until the phase angle $\delta$ reaches the value which yields maximum output power. Because the third harmonic voltage $V_3$ is readily obtained and it contains all the information needed for the control of the rectifier bridge 108, the implementation of the third harmonic control strategy is very cost effective.

A phase current detector 142 could also be used with the third harmonic detector 136. In addition, a dc link current sensor 144 can be used as feedback to the microprocessor 124 to form a closed loop control for power optimization from the alternator 106.

In a fourth strategy, the phase current detector 142 and a phase voltage detector 146 can be used to estimate the position of the back EMF from the determined phase current and voltage. This estimate results in an existing delay angle between the estimated back EMF and voltage which is compared to a desired delay angle read from an empirically determined look-up table. The delay angle between the estimated back EMF and voltage is then adjusted until the estimated delay angle and the desired delay angle match one another.

As noted above, the output of the alternator 106 can be controlled by controlling the angle between the back EMF and the terminal voltage of each phase. Fortunately, the relationship between the angle and the output current is simple: the bigger the angle, but not bigger than 900, the higher the output. Therefore, if it is necessary to increase the output, the angle is increased and, if it is necessary to decrease the output, the angle is decreased. These adjustments can be made by adding or subtracting delay increments such that the desired output is reached over a number of cycles of the alternator output. After the output current reaches the demanded value, the delay is maintained until another change is necessary.

It is noted that to increase the output current, the switching mode change is delayed. This is due to the fact that the variables under direct control are the terminal voltages rather than the phase currents because the battery is a voltage source. To increase the output current the machine terminal voltages should be delayed so that the angle between the back EMF and the voltages can be increased. Advancing the change of switching mode is going in the opposite direction.

As noted above, the terminal voltage frequency determined by the switches of the bridge 108 must be the same as the synchronous frequency of the alternator 106. If the synchronous frequency is known, the terminal voltage frequency can be guaranteed to be the same as the synchronous frequency by keeping the duration time of each switching mode equal to one sixth of the synchronous cycle and changing the switching mode according to the sequence given in FIG. 7. To determine the synchronous frequency, the third harmonic detector 136 may be used because the information about the synchronous frequency is contained in the third harmonic voltage. Thus, by detecting the zero-crossing of the third harmonic voltage, which can be easily obtained by adding three phase voltages together, the synchronous frequency can be determined. If the alternator speed changes, the frequency of the third harmonic voltage also changes, which in turn changes the timing of the switching of the mode of the connections of the bridge 108 so that the terminal voltage frequency follows the back EMF frequency.

To avoid such problems as machine parameter variation, model deficiency, and difficulties in load prediction, it is currently preferred to empirically select an optimum delay angle for operation of an alternator in accordance with the present invention, as described above, and utilize that optimum delay angle with closed loop control based on battery voltage. For this mode of control, the field current is initially controlled up to a maximum field current. Upon reaching maximum field current, the angle of delay is set to the determined optimum value if the battery voltage is lower than a lower bottom limit and if the battery voltage is higher than a set upper limit the angle of delay is set to zero. As stated above, the angle control can be accomplished by controlling the duration time of each switching mode.

Since the controlled bridge increases the current of the alternator 106, the alternator 106 will have higher losses. If the cooling conditions limit the current to a value lower than the maximum output current, which is electromagnetically possible, the dc link current sensor is used to detect the maximum current operation point. The angle can then be held to less than the corresponding angle to protect the machine if the measured current has reached the current limit, which is determined by the cooling conditions.

For a system with a full wave controlled rectifier bridge, such as the bridge 108, the increase in the output current is achieved with a penalty: the output power factor is smaller than unity. To avoid unnecessary penalty, the controlled bridge is not activated until the field current reaches its maximum value. Until that time, all six switches of the bridge 108 are turned off and the body diodes of the six MOSFETs $A^+$, $A^-$, $B^+$, $B^-$, $C^+$, $C^-$ operate as a conventional diode bridge for the alternator 106. Also, when the current needs to be reduced, the delay angle should be reduced first to reduce the reactive current component. The field current will not be decreased until the delay angle has reached zero and the controlled rectification performed by the bridge 108 is terminated.

Figure 9:
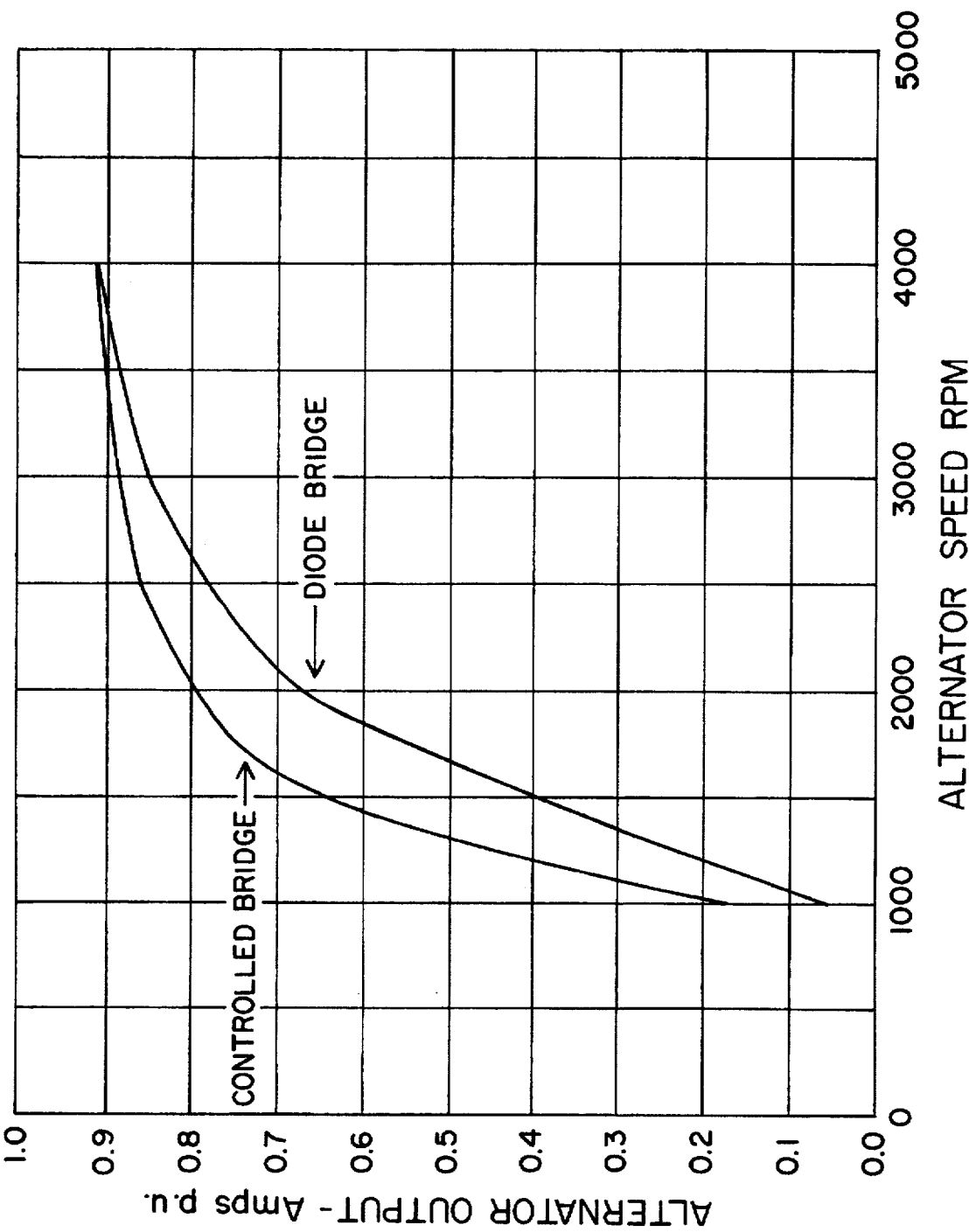
FIG. 9 is a graphical representation of the improvement of alternator performance in accordance with the present invention.

In summary, in the present invention, a conventional full wave diode bridge is replaced with a full wave bridge having controlled switches which are parallel connected with inverse diodes as shown in FIG. 6. The MOSFETs can be thought of as controlled switches overlaying a conventional diode bridge but with the body diodes of the MOSFETs forming the conventional diode bridge. When phase control is initiated as described above, the controlled switches preempt natural commutation of the diodes and shift the phase of the alternator phase voltages relative to the phase currents. The phase angle control disrupts the normal unity power factor operation of the alternator and causes additional reactive current flow in the stator winding 116 that is sourced by the bridge 108. The result is that for the same operating conditions the controlled switches of the bridge 108 boost output from the alternator by from 40% to 60% as shown in FIG. 9.

Having thus described the invention of the present application in detail and by reference to preferred embodiments thereof, it will be apparent that modifications and variations are possible without departing from the scope of the invention defined in the appended claims.

What is claimed is:

1. A method of operating an alternator to generate ac power which is rectified to produce dc power at a dc output, said alternator including a three phase stator winding having three output connections and a rotor having a field winding receiving a field current, being magnetically coupled to said stator winding and being mechanically driven to generate three phase power at said three output connections of said stator winding, said method comprising the steps of:

connecting a full wave controlled rectifier bridge between said three output connections of said stator winding and said dc output;

determining a third harmonic of voltage generated by said alternator; and controlling said rectifier bridge in response to said third harmonic to synchronize said rectifier bridge with said alternator.

2. A method of operating an alternator as claimed in claim 1 wherein said step of controlling said rectifier bridge in response to said third harmonic to synchronize said rectifier bridge with said alternator comprises the steps of:

determining the zero crossings of said third harmonic; and sequencing said full wave controlled rectifier bridge through a series of operating modes in response to zero crossings of said third harmonic.

3. A method of operating an alternator as claimed in claim 1 further comprising the step of controlling said rectifier bridge to introduce a phase angle between phase voltages at said three output connections of said stator winding and said third harmonic to control dc power output by said alternator.

4. A method of operating an alternator as claimed in claim 3 wherein said step of controlling said rectifier bridge to introduce a phase angle between phase voltages at said three output connections of said stator winding and said third harmonic comprises the step of controlling said rectifier bridge to introduce an optimum phase angle between phase voltages at said three output connections of said stator winding and said third harmonic to maximize dc power output by said alternator.

5. A method of operating an alternator as claimed in claim 4 further comprising the step of empirically determining said optimum phase angle.

6. A method of operating an alternator as claimed in claim 1 further comprising the step of controlling said field current to control dc power output.

7. A method of operating an alternator as claimed in claim 6 further comprising the steps of:

determining whether said field current is at a maximum; and if said field current is at a maximum, controlling said rectifier bridge to introduce a phase angle between phase voltages at said three output connections of said stator winding and said third harmonic to control dc power output by said alternator.

8. A method of operating an alternator as claimed in claim 7 further comprising the step of controlling said rectifier bridge to introduce an optimum phase angle between phase voltages at said three output connections of said stator winding and said third harmonic to maximize dc power output by said alternator.

9. A method of operating an alternator to generate ac power which is rectified to produce dc power at a dc output, said alternator including a three phase stator winding having three output connections and a rotor having a field winding receiving a field current, being magnetically coupled to said stator winding and being mechanically driven to generate three phase power at said three output connections of said stator winding, said method comprising the steps of:

connecting a full wave controlled rectifier bridge between said three output connections of said stator winding and said dc output;

determining a third harmonic of voltage generated by said alternator;

controlling said rectifier bridge in response to said third harmonic to synchronize said rectifier bridge with said alternator; and further controlling said rectifier bridge to define a phase angle between phase voltages at said three output connections of said stator winding and said third harmonic.

10. A method of operating an alternator as claimed in claim 9 further comprising the step of determining an optimum phase angle between phase voltages at said three output connections of said stator winding and said third harmonic.

11. A method of operating an alternator as claimed in claim 10 wherein said step of determining an optimum phase angle comprises the step of mapping output power of said alternator onto said phase angle.

12. A method of operating an alternator as claimed in claim 9 further comprising the step of controlling said field current.

13. A method of operating an alternator as claimed in claim 12 further comprising the step of coordinating said steps of controlling said field current and further controlling said rectifier bridge to improve operation of said alternator.

14. A method of operating an alternator as claimed in claim 13 wherein said step of coordinating said steps of controlling said field current and further controlling said rectifier bridge comprises the steps of:

controlling said field current to increase power output of said alternator; and upon reaching a maximum field current, further controlling said rectifier bridge to introduce an appropriate phase angle between phase voltages at said three output connections of said stator winding and said third harmonic in accordance with required output power from said alternator.

15. A method of operating an alternator as claimed in claim 13 wherein said method further comprises the step of determining an optimum phase angle between phase voltages at said three output connections of said stator winding and said third harmonic, and said step of further controlling said rectifier bridge to introduce an appropriate phase angle comprises increasing said phase angle up to a maximum phase angle to increase output power of said alternator.

16. A method or operating an alternator as claimed in claim 15 further comprising the step of decreasing said phase angle from said maximum phase angle to substantially zero before reducing said field current from a maximum field current.

17. A method of operating an alternator to generate ac power which is rectified to produce dc power at a dc output, said alternator including a three phase stator winding having three output connections and a rotor having a field winding receiving a field current, being magnetically coupled to said stator winding and being mechanically driven to generate three phase power at said three output connections of said stator winding, said method comprising the steps of:

connecting a full wave controlled rectifier bridge between said three output connections of said stator winding and said dc output;

determining a third harmonic of voltage generated by said alternator;

controlling said rectifier bridge in response to said third harmonic to synchronize rectifier bridge with said alternator;

controlling said field current in response to output power required from said alternator up to a maximum field current; and upon reaching said maximum field current, further controlling said rectifier bridge to introduce a phase angle between phase voltages at said three output connections of said stator winding and said third harmonic in response to output power required from said alternator.

18. A method of operating an alternator as claimed in claim 17 further comprising the step of controlling said rectifier bridge to introduce an optimum phase angle between phase voltages at said three output connections of said stator winding and said third harmonic to maximize dc power output by said alternator.

* * * * *